(12) United States Patent
Hernandez et al.

(10) Patent No.: US 10,077,653 B2
(45) Date of Patent: Sep. 18, 2018

(54) AUTOMATIC MUD PULSE TELEMETRY BAND SELECTION

(71) Applicant: Schlumberger Technology Corporation, Sugar Land, TX (US)

(72) Inventors: Matias Francisco Hernandez, Stonehouse (GB); Sandra Reyes, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/552,446

(22) PCT Filed: Feb. 23, 2016

(86) PCT No.: PCT/US2016/019193
§ 371 (c)(1),
(2) Date: Aug. 21, 2017

(87) PCT Pub. No.: WO2016/138039
PCT Pub. Date: Sep. 1, 2016

(65) Prior Publication Data
US 2018/0045043 A1    Feb. 15, 2018

Related U.S. Application Data

(60) Provisional application No. 62/120,303, filed on Feb. 24, 2015.

(51) Int. Cl.
*E21B 47/16*     (2006.01)
*E21B 47/18*     (2012.01)
(Continued)

(52) U.S. Cl.
CPC .............. *E21B 47/18* (2013.01); *H04B 1/00* (2013.01); *E21B 47/02208* (2013.01)

(58) Field of Classification Search
CPC ...... E21B 47/18; E21B 47/02208; H04B 1/00
(Continued)

(56) References Cited

U.S. PATENT DOCUMENTS 5,073,877 A   12/1991 Jeter
6,970,398 B2  11/2005 Lavrut et al.
(Continued)

FOREIGN PATENT DOCUMENTS

EP       2763335 A1    8/2014

OTHER PUBLICATIONS

International Search Report and Written Opinion issued in PCT/US2016/019193 dated May 11, 2016. 9 pages.
(Continued)

*Primary Examiner* — Tanmay Shah

(57) ABSTRACT

A method for automatically selecting a frequency band for transmission of a mud pulse telemetry signal includes transforming acquired transducer measurements from a time domain to a frequency domain to obtain a spectrum of measurements. The spectrum of measurements is processed to compute a total energy in band and a standard deviation of the power spectral density in band for a plurality of frequency bands. A ratio of the total energy in band to the standard deviation acquiring a plurality of transducer measurements of transmitted mud pulse telemetry pressure pulses and of the power spectral density in band is computed for at least two of the plurality of frequency bands. The frequency band having the highest computed ratio is selected and automatically downlinked to a downhole mud pulse telemetry transmitter.

9 Claims, 5 Drawing Sheets

(51) Int. Cl.
*H04B 1/00* (2006.01)
*E21B 47/022* (2012.01)

(58) Field of Classification Search
USPC .......................................... 367/83
See application file for complete search history.

(56) References Cited

U.S. PATENT DOCUMENTS

| | | | | |
|---|---|---|---|---|
| 7,068,183 | B2 * | 6/2006 | Shah | G01V 11/002 340/853.3 |
| 7,228,902 | B2 | 6/2007 | Oppelt | |
| 2006/0109141 | A1 * | 5/2006 | Huang | E21B 47/18 340/855.4 |
| 2008/0204270 | A1 * | 8/2008 | Aiello | E21B 47/18 340/855.4 |
| 2009/0245327 | A1 * | 10/2009 | Michaels | H04B 1/707 375/130 |
| 2015/0351043 | A1 * | 12/2015 | De Gaudenzi | H04W 52/10 370/329 |

OTHER PUBLICATIONS

Lusky et al, Adaptive Algorithms for Choosing Transmission Parameters in Dynamic Channel Conditions. Texas Instruments. Sep. 5, 2002.

* cited by examiner

AUTOMATIC MUD PULSE TELEMETRY BAND SELECTION

RELATED APPLICATIONS

This application claims the benefit of and priority to U.S. Provisional Patent Application No. 62/120,303, filed on Feb. 24, 2015, the entire disclosure of which is incorporated herein by reference.

FIELD

The disclosed embodiments relate generally to downhole communication methods in subterranean drilling operations and in particular to a method for automatically selecting a mud pulse telemetry frequency band.

BACKGROUND

Typical petroleum drilling operations employ a number of techniques to gather information about the wellbore and the formation through which it is drilled. Such techniques are commonly referred to in the art as measurement while drilling (MWD) and logging while drilling (LWD). MWD and LWD techniques may be used, for example, to obtain information about the well (e.g., information about the size, shape, and direction thereof) and the properties of the surrounding formation (e.g., the density, porosity, and resistivity thereof which may be related to the hydrocarbon bearing potential).

Transmission of data from a downhole tool in the drill string to the surface is a difficulty common to many MWD and LWD operations. Mud pulse telemetry techniques may be utilized for such data transmission. In mud pulse telemetry operations, data may be encoded as a series of pressure pulses that are transmitted through the column of drilling fluid to the surface. These pressure pulses are measured at the surface where they may be decoded to provide the transmitted data to the drilling operator.

Mud pulse telemetry signals are well known to be highly noisy and attenuated such that the resulting data transmission rate is generally very slow (e.g., on the order of about 1 to about 10 bits per second or even less). The noise and attenuation commonly depend on many factors including the wellbore depth, drilling fluid properties, the physical structure of the drill string, and the frequency of the transmitted signal. Signal noise and attenuation can vary widely during a drilling operation such that there is a need for improved telemetry methods that automatically select the frequency band of the mud pulse telemetry channel.

SUMMARY

A method for automatically selecting a frequency band for transmission of a mud pulse telemetry signal is disclosed. The method includes acquiring a plurality of transducer measurements of transmitted mud pulse telemetry pressure pulses and transforming the acquired transducer measurements from a time domain to a frequency domain to obtain a spectrum of measurements. The spectrum of measurements is processed to compute a total energy in band and a standard deviation of the power spectral density in band for a plurality of frequency bands. A ratio of the total energy in band to the standard deviation of the power spectral density in band is computed for at least two of the plurality of frequency bands. The frequency band having the highest computed ratio is selected and automatically downlinked to a downhole mud pulse telemetry transmitter.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed embodiments, and advantages thereof, reference is now made to the following descriptions taken in conjunction with the accompanying drawings, in which.

DETAILED DESCRIPTION

Figure 1:
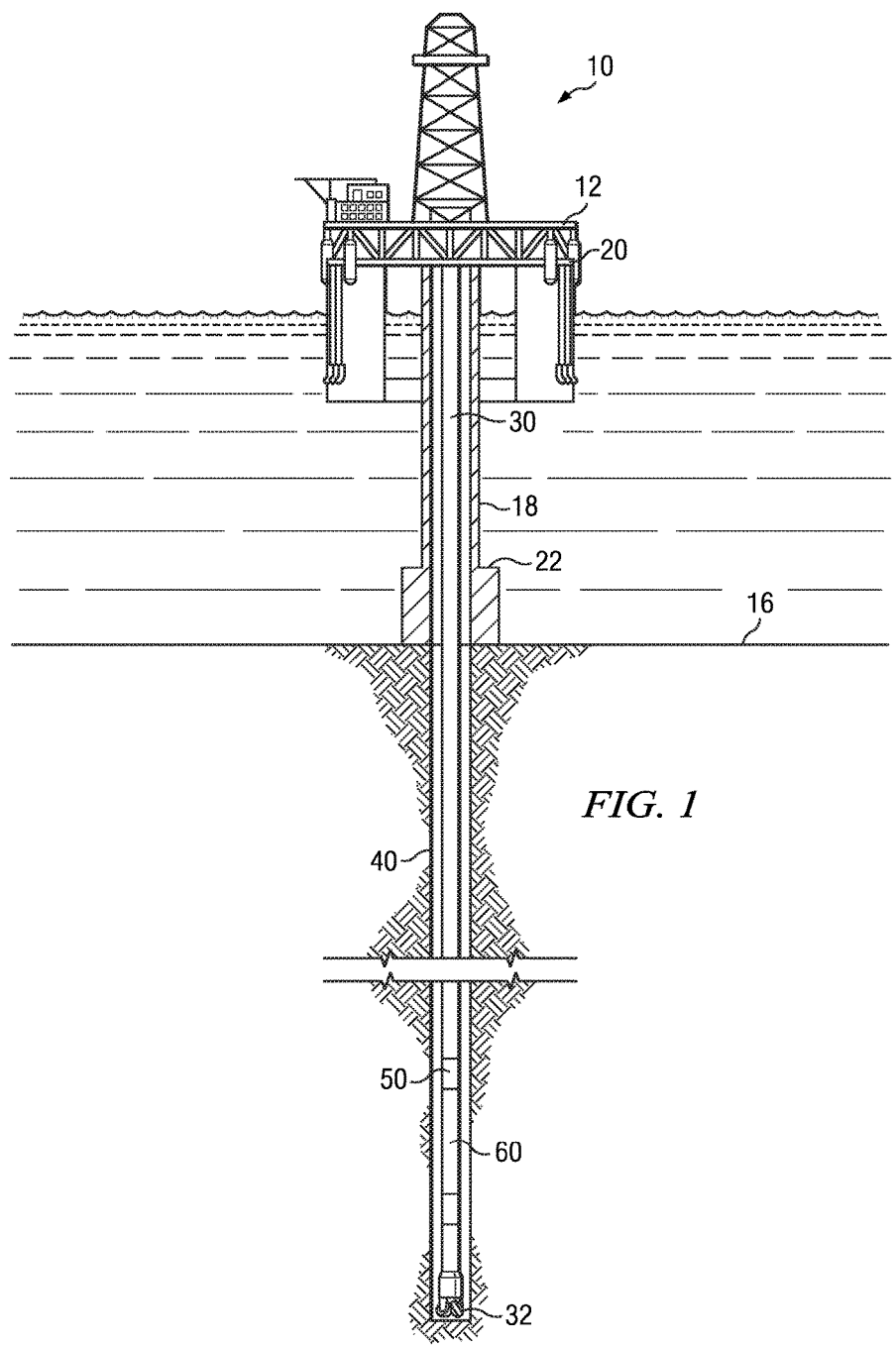
FIG. 1 depicts a drilling rig on which the disclosed method embodiments may be utilized.

FIG. 1 depicts one example of an offshore drilling assembly, generally denoted 10, suitable for employing the disclosed method embodiments. In FIG. 1 a semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering the drill string 30, which, as shown, extends into borehole 40 and includes drill bit 32, a transmission device 50 (e.g., a electromechanical pulser or a mud siren), and at least one MWD and/or LWD tool 60. Drill string 30 may optionally further include substantially any number of other downhole tools including, for example, other MWD and/or LWD tools, stabilizers, a rotary steerable tool, a reamer, and a downhole drilling motor. The disclosed embodiments are not limited in this regard.

It will be understood that the MWD and/or LWD tool 60 may include substantially any suitable downhole measurement sensors. An MWD tool commonly includes survey sensors such as accelerometers, magnetometers, and/or gyroscopic sensors for measuring the orientation of the wellbore with respect to a fixed reference such as the Earth's gravitational and magnetic fields. LWD tools commonly include one or more formation evaluation sensors, such as internal or annular pressure sensors, temperature sensors, natural gamma ray sensors, neutron sensors, density sensors, electromagnetic antennas, resistivity sensors, ultrasonic sensors, audio-frequency acoustic sensors, and the like. The disclosed embodiments are not limited in this regard.

It will further be understood that the deployment illustrated on FIG. 1 is merely an example and that the disclosed embodiments are not limited to use with a semisubmersible platform 12 as depicted. The disclosed embodiments are equally well suited for use with any kind of subterranean drilling operation, either offshore or onshore.

Figures 2, 3:
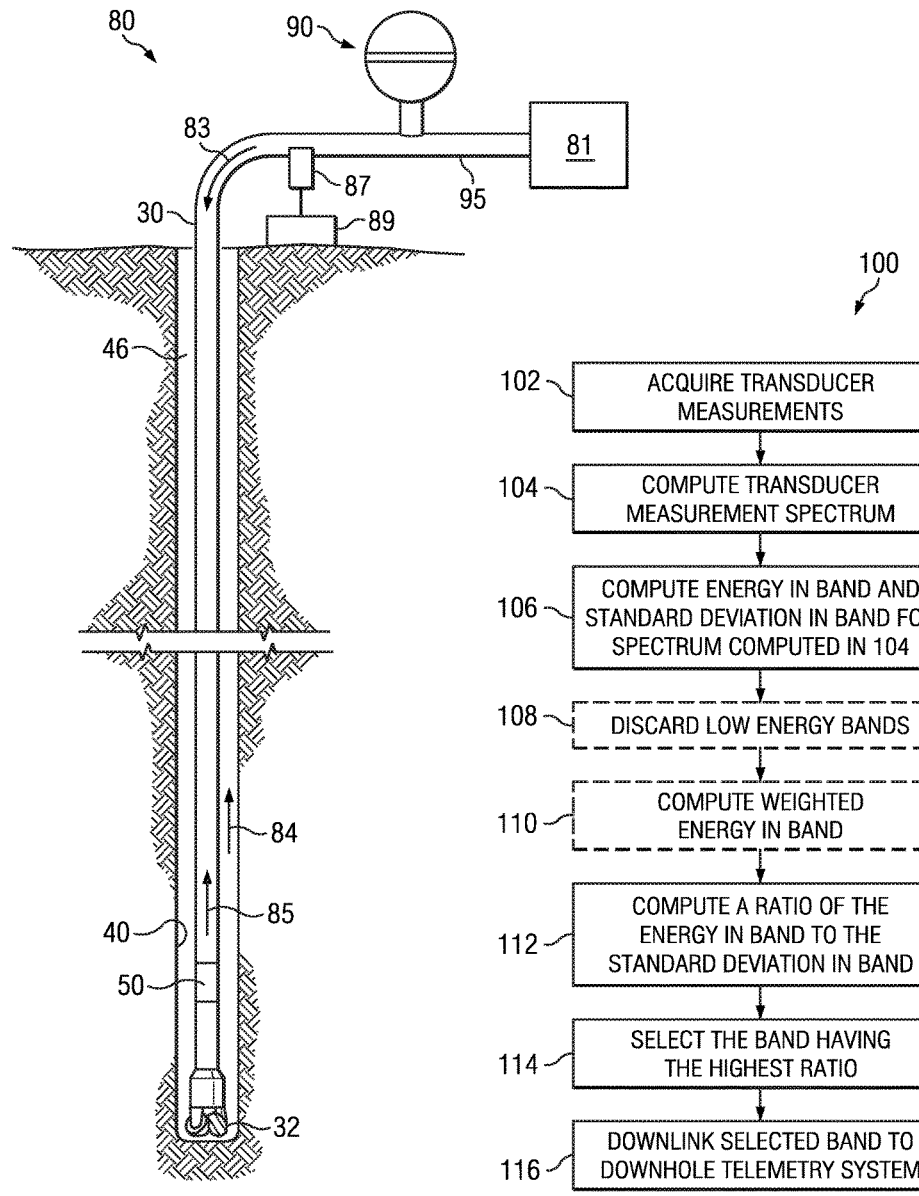
FIG. 2 depicts a mud flow arrangement in which the disclosed methods may be utilized.
FIG. 3 depicts a flowchart of one disclosed method embodiment.

Referring now to FIG. 2, one example of a drilling fluid system 80 employed in a downhole drilling system is illustrated. During a drilling operation, drilling fluid (commonly referred to as "mud" in the art) is pumped downward through the drill string and the bottom hole assembly (BHA) where it emerges at or near the drill bit at the bottom of the wellbore. The mud serves several purposes, including cooling and lubricating the drill bit, clearing cuttings away from the drill bit and transporting them to the surface, and stabilizing and sealing the formation(s) through which the borehole traverses.

In the depicted drilling fluid system 80, a mud pump 81 generates a downward traveling flow 83 of drilling fluid (mud) into a standpipe 95 and down through the drill string 30. Rotation of the drill string (and/or drill bit 32) cuts the formation and creates the wellbore 40 in the earth (or in sea floor 16 as shown on FIG. 1). The mud flow 83 emerges at or near the drill bit 32 and creates an upwardly traveling mud flow 84 through annulus 46 (the space between the drill string 30 and the borehole wall). The drilling fluid system 80 may further include a pulsation dampener 90 (also referred to in the art as a desurger) that evens out the flow 83 in the standpipe 95 and the drill string 30. The pulsation dampener 90 essentially acts like an accumulator to smooth outlet pressure generated by the mud pump 81.

MWD and/or LWD data is encoded downhole (e.g., via a conventional downhole controller). A transmission device 50, such as a conventional electromechanical mud pulser or a mud siren, produces an acoustic pressure wave 85 (e.g., including a plurality of pressure pulses which encode the data). Commonly assigned U.S. Pat. Nos. 5,073,877 and 6,970,398, which are incorporated by reference in their entirety herein, disclose suitable mud pulse telemetry transmission devices. The pressure wave 85 travels towards the surface at approximately the speed of sound (e.g., in the range from about 2000 to about 4500 feet per second) through the downward traveling mud 83 in the drill string 30. It will be appreciated that the signal may also be transmitted through and received from the upward traveling mud flow 84 in the annulus 46 (although such transmission is uncommon). It will also be appreciated that the disclosed embodiments are not limited to any particular pressure wave or pressure pulse configuration and that substantially any suitable encoding schemes may be utilized.

The transmitted pressure wave 85 may be received (detected) at one or more sensors (e.g., transducers) 87 at the surface and processed as described in more detail below. It will be understood that such processing may employ substantially any suitable processing means 89 (e.g., a computer or controller). Implicit in the control and processing of the received signals described herein is the use of a computer program (software or firmware) executed on a suitable computer platform (hardware) including, for example, a microprocessor and machine readable electronic memory. The disclosed embodiments are, of course, not limited to any particular controller/computer configuration. Substantially any suitable transducer arrangement may also be utilized.

FIG. 3 depicts a flowchart of one disclosed method embodiment 100. Pressure pulses in the drilling fluid are received at one or more transducers at 102 (e.g., at transducer 87 on FIG. 2). For example, transducer data may be continuously acquired over a short time window (e.g., in a range from about 10 to about 100 seconds or more). The transducer data is processed at 104 to compute a spectrum (i.e., to transform the transducer data from a time domain to a frequency domain). Such processing may employ, for example, a fast Fourier transform (FFT) or another suitable transform known to those of ordinary skill in the art. The spectrum may be further processed at 106 to compute the total energy in band and the standard deviation of the power spectral density in band using small increments in frequency (and optionally bandwidth). The in band energy and the in band standard deviation may be computed, for example, using the following mathematical equations:

$$E(fc, BW) = \sum_{k=fc-\frac{BW}{2}}^{fc+\frac{BW}{2}} S(k)^2$$

and $$Sdev(fc, BW) = \sqrt{\frac{1}{BW} \sum_{k=fc-\frac{BW}{2}}^{fc+\frac{BW}{2}} (PSD(k) - \overline{PSD(k)})^2}$$

where E(fc, BW) represents the total energy in band, Sdev(fc, BW) represents the standard deviation of the power spectral density in band (also referred to as the standard deviation in band), fc represents the center frequency of the band, BW represents the bandwidth of the band, S(k) represents the magnitude of the spectrum at each incremental frequency, and PSD(k) represents the magnitude squared at each incremental frequency.

It will be understood that the total energy in band and the standard deviation of the power spectral density in band may be computed for substantially any plurality of frequency bands having substantially any suitable bandwidth. Moreover, the frequency bands may be overlapping or non-overlapping. In one example embodiment the total energy in band and the standard deviation of the power spectral density in band may be computed for 20 distinct non-overlapping frequency bands each of which has a bandwidth of 1 Hz. In other embodiments, the energy in band and the standard deviation in band may be computed for 10 distinct frequency bands. In another embodiment, the energy in band and the standard deviation in band may be computed only for selected bands at which the MWD tool is able to transmit (e.g., at 1, 2, 3, 4, and 5 Hz). The disclosed embodiments are of course not limited in this regard.

It will be further understood that the drilling fluid in the drill string tends to function as a low pass filter such that higher frequencies can be significantly attenuated (e.g., at frequencies greater than about 40 Hz (or about 20 Hz) depending on the length of the drill string). Thus, in certain embodiments, the energy in band and the standard deviation of the power spectral density in band need not be computed at higher frequency bands.

With continued reference to the flow chart on FIG. 3, method 100 may optionally further include eliminating selected low energy bands at 108 and weighting the energy in band by the center frequency of the band at 110. While these steps are optional they may be beneficial in certain applications. For example, destructive interference in the communication channel (the mud column) may result in very low signal energies at certain frequencies. Moreover these frequencies at which destructive interference occur may not be constant. It may therefore be advantageous to identify and eliminate these frequency bands from further consideration. For example, in certain embodiments, frequency bands having an energy in band value less than a predetermined threshold may be eliminated at 108. It will be understood that substantially any suitable threshold may be utilized. For example, the threshold may be obtained by multiplying the smallest computed total energy in band by a factor (such as 10).

As stated above, the drilling fluid in the drill string tends to attenuate higher frequency signals and function as a low pass filter. It may therefore be advantageous to compute a weighted energy in band at 110 in which the received energies at higher frequencies are assigned higher weights. For example, a linear weighting function may be used in which the energy in band is multiplied by the center frequency of the band. In an embodiment, the weighting function may include the inverse of a low pass filter (e.g., the weighting function may equal $\sqrt{1+fc^2}$, where fc is as defined above). The disclosed embodiments are not limited to the use of any particular weighting function. Nor are they limited to computing a weighted energy in band.

With further reference to FIG. 3, a ratio of the energy in band to the standard deviation in band may be computed for each frequency band at 112 (or for each frequency band that is not eliminated at 108). In embodiments in which the energy in band is weighted at 110 a ratio of the weighted energy in band to the standard deviation in band may be computed at 112. The frequency band having the highest ratio may then be selected at 114 as the optimum frequency band for mud pulse telemetry. Method 100 may then automatically trigger a surface controller to downlink the selected frequency band from the surface processor to the downhole telemetry system at 116.

Figure 4:
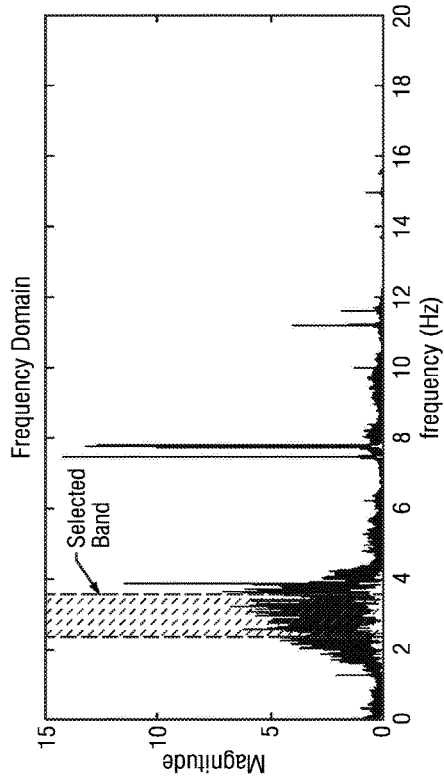
FIG. 4 depicts a plot of magnitude versus frequency (a spectrum) of a received pressure signal.

FIG. 4 depicts one example of a spectrum computed at 104 of method 100 (shown on FIG. 3). The spectrum includes a plot of magnitude versus frequency (in units of Hz) for transducer data acquired at a frequency of 240 Hz during over a 30 second interval (for a total of 7200 transducer measurements). An optimum band (e.g., selected at 114 of FIG. 3) is depicted as being centered at about 3 Hz.

Figure 5:
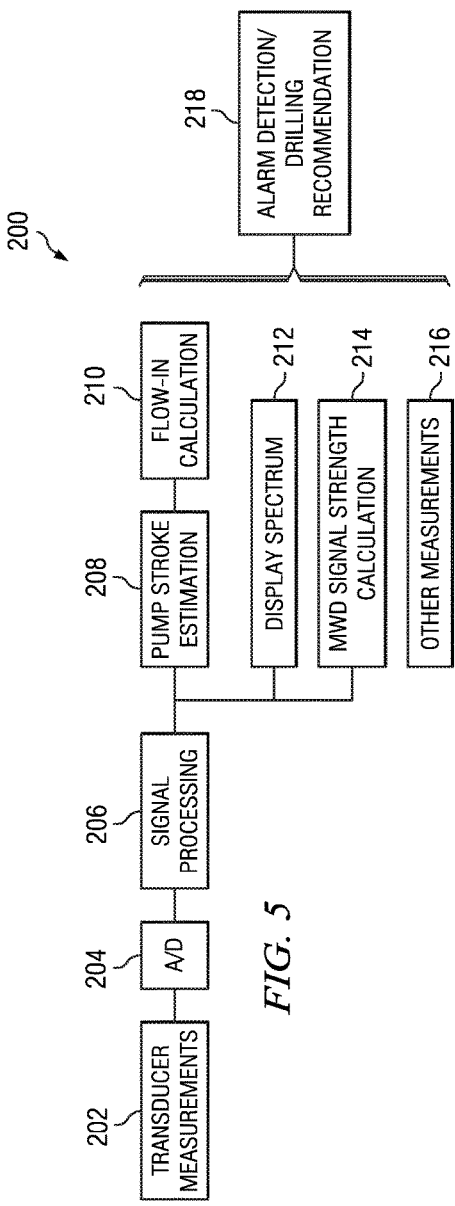
FIG. 5 depicts a block diagram of a disclosed method embodiment.

FIG. 5 depicts a block diagram of a disclosed method embodiment 200. Stand pipe transducer (pressure) measurements are acquired at 202 over a wide frequency band (e.g., in a range from about 0 to about 240 Hz). The measurements are digitized at 204 and processed at 206. The processing may include, for example, a pump stroke estimation at 208 with a flow in calculation at 210, a spectrogram display at 212, and an MWD signal strength calculation at 214. The processed measurements may then be utilized in combination with other surface or downhole measurements 216 to trigger various alarms and/or make drilling recommendations for the drilling operator at 218.

The pump stroke estimation at 208 using the stand pipe transducer measurements may advantageously obviate the need to install pump stroke sensors in the mud pumps. The estimated pump strokes may then be used to further estimate the flow in of drilling fluid (e.g., the drilling fluid flow rate) based on an estimated mud volume per pump stroke. Further flow in information may be utilized various alarms (e.g., kick, washout, lost circulation, etc.).

Figure 6:
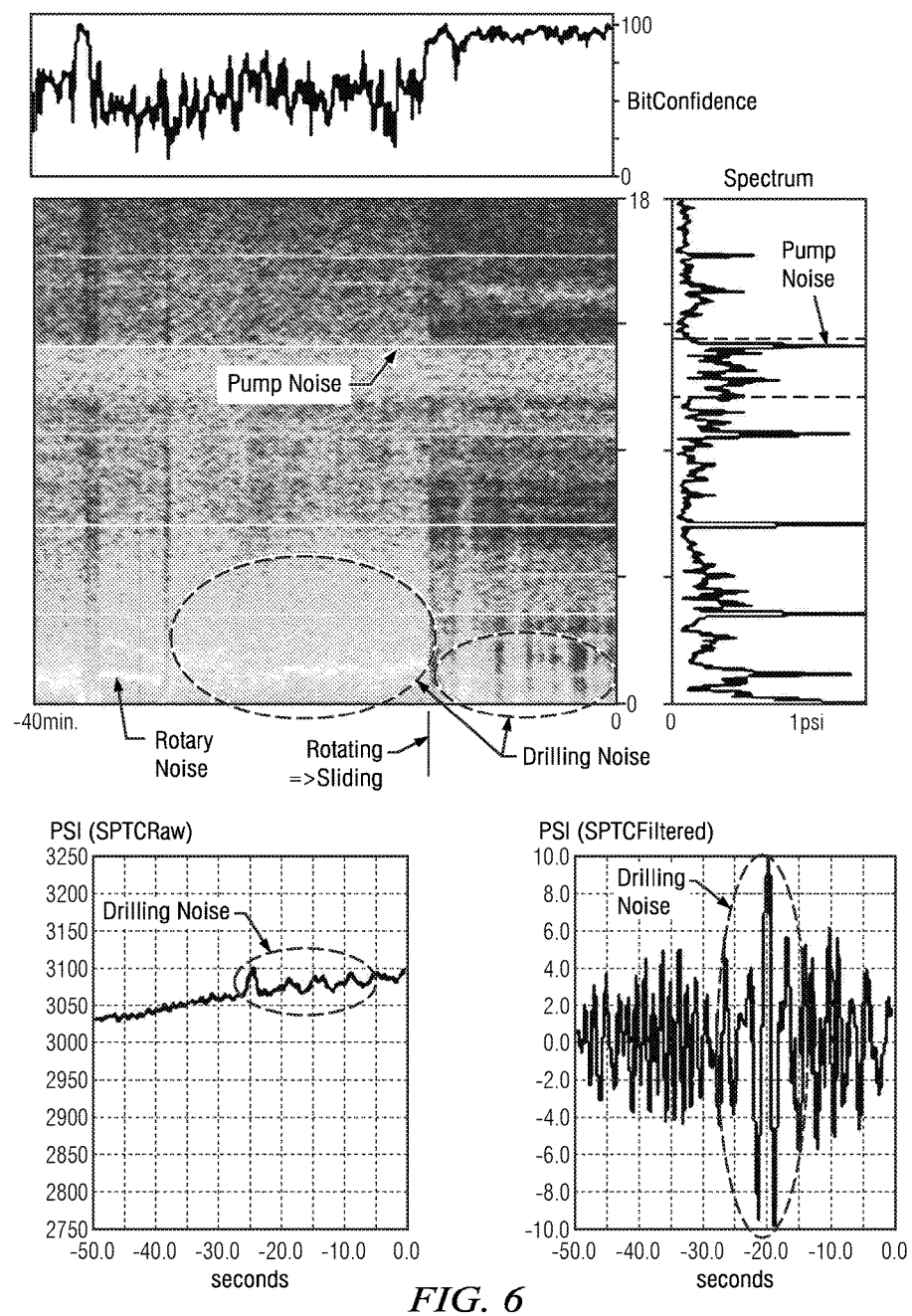
FIGS. 6 and 7 depict various spectra that show incidents of rotary noise, drilling noise, pump noise and mud motor stalls.
Figure 7:
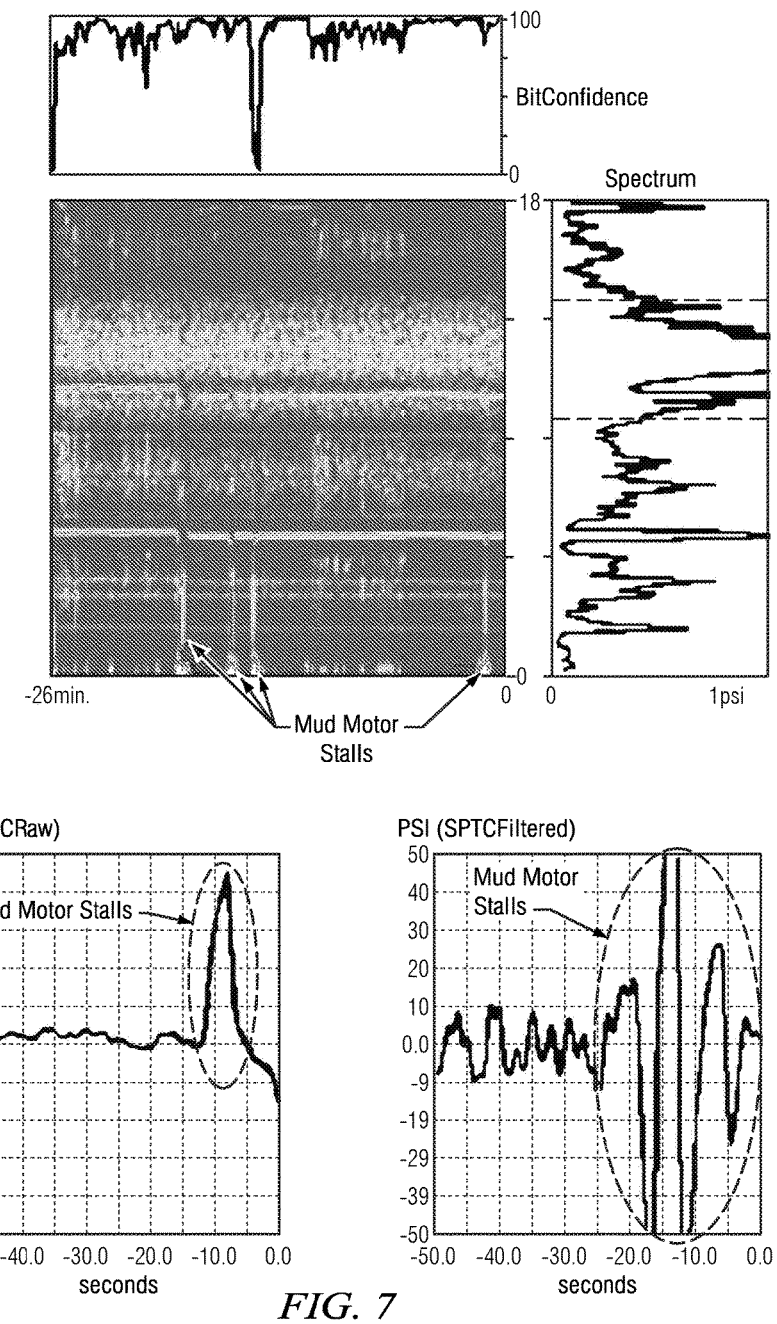

The transducer measurements may be displayed at 212, for example, in the time domain or the frequency domain. FIGS. 6 and 7 depict various spectra that show incidents of rotary noise, drilling noise, pump noise and mud motor stalls. Evaluation of these spectra may reveal changes in the drilling environment and drilling activities over time. For example, evaluation of the noise signal may enable an optimum weight on bit (WOB) and drill string rotation rate (RPM) to be achieved while drilling. Based on the spectrum the drilling operator may manually adjust the WOB and RPM to achieve the desired drilling conditions (i.e., having the desired noise signal in the spectrum). The spectrum may also indicate incidents of mud motor stalling which tend to result in noise spikes in the spectrum. The drilling fluid flow rate and the WOB may be adjusted to minimize mud motor stalling incidents (based on the evaluation of the spectrum noise).

The mud pulse telemetry signal strength may also be evaluated at 214 to identify incidents of wellbore washout. In general, a washout tends to reduce the MWD signal strength. A reduction in MWD signal strength may therefore be indicative of wellbore washout.

An automatic method for selecting a mud pulse telemetry band and certain advantages thereof have been described in detail, it should be understood that various changes, substitutions and alternations can be made herein without departing from the spirit and scope of the disclosure. Features shown in individual embodiments referred to above may be used together in combinations other than those which have been shown and described specifically. Accordingly, all such modifications are intended to be included within the scope of this disclosure. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke means-plus-function for any limitations of any of the claims herein, except for those in which the claim expressly uses the words 'means for' together with an associated function.

We claim:

1. A method for automatically selecting a frequency band for transmission of a mud pulse telemetry signal, the method comprising:
    (a) acquiring a plurality of transducer measurements of transmitted mud pulse telemetry pressure pulses;
    (b) transforming the transducer measurements acquired in (a) from a time domain to a frequency domain to obtain a spectrum of measurements;
    (c) processing the spectrum of measurements to compute a total energy in band and a standard deviation of the power spectral density in band for a plurality of frequency bands;
    (d) computing a ratio of the total energy in band to the standard deviation of the power spectral density in band for at least two of the plurality of frequency bands;
    (e) selecting the frequency band having the highest ratio computed in (d); and
    (f) automatically downlinking the frequency band selected in (e) to a downhole mud pulse telemetry transmitter.

2. The method of claim 1 wherein the transducer measurements are transformed in (b) using a fast Fourier transform.

3. The method of claim 1, wherein the total energy in band and the standard deviation of the power spectral density in band are computed using the following mathematical equations:

$$E(fc, BW) = \sum_{k=fc-\frac{BW}{2}}^{fc+\frac{BW}{2}} S(k)^2$$

$$Sdev(fc, BW) = \sqrt{\frac{1}{BW} \sum_{k=fc-\frac{BW}{2}}^{fc+\frac{BW}{2}} (PSD(k) - \overline{PSD(k)})^2}$$

wherein E(fc, BW) represents the total energy in band, Sdev(fc, BW) represents the standard deviation of the power spectral density in band, fc represents a center frequency of the frequency band, BW represents a bandwidth of the frequency band, S(k) represents a magnitude of the spectrum at each incremental frequency, and PSD(k) represents a magnitude squared at each incremental frequency.

4. The method of claim 1, wherein (c) and (d) in combination comprise:
   (i) processing the spectrum of measurements to compute the total energy in band and the standard deviation of the power spectral density in band for the plurality of frequency bands;
   (ii) discarding frequency bands in which the total energy in band is less than a threshold; and
   (iii) computing a ratio of the total energy in band to the standard deviation of the power spectral density in band for the frequency bands not discarded in (ii).

5. The method of claim 4, wherein the threshold is ten times a smallest energy in band computed (i).

6. The method of claim 1, wherein (c) and (d) in combination comprise:
   (i) processing the spectrum of measurements to compute the total energy in band and the standard deviation of the power spectral density in band for the plurality of frequency bands;
   (ii) processing the total energy in band and a center frequency of the frequency band to compute a weighted energy in band; and
   (iii) computing a ratio of the weighted energy in band to the standard deviation of the power spectral density in band for the frequency bands not discarded in (ii).

7. The method of claim 6, wherein the processing in (ii) assigns more weight to the total energy in band in higher frequency bands.

8. The method of claim 6, wherein the total energy in band is weighted by a factor equal to: $\sqrt{1+fc^2}$, where fc represents the center frequency.

9. The method of claim 1, wherein (c) and (d) in combination comprise:
   (i) processing the spectrum of measurements to compute the total energy in band and the standard deviation of the power spectral density in band for the plurality of frequency bands;
   (ii) discarding frequency bands in which the total energy in band is less than a threshold;
   (iii) processing the total energy in band and a center frequency of the frequency band to compute a weighted energy in band; and
   (iv) computing a ratio of the weighted energy in band to the standard deviation of the power spectral density in band for the frequency bands not discarded in (ii).

* * * * *